May 2, 1939. W. SCHASSLER 2,156,515
BEVERAGE VESSEL
Filed June 26, 1937
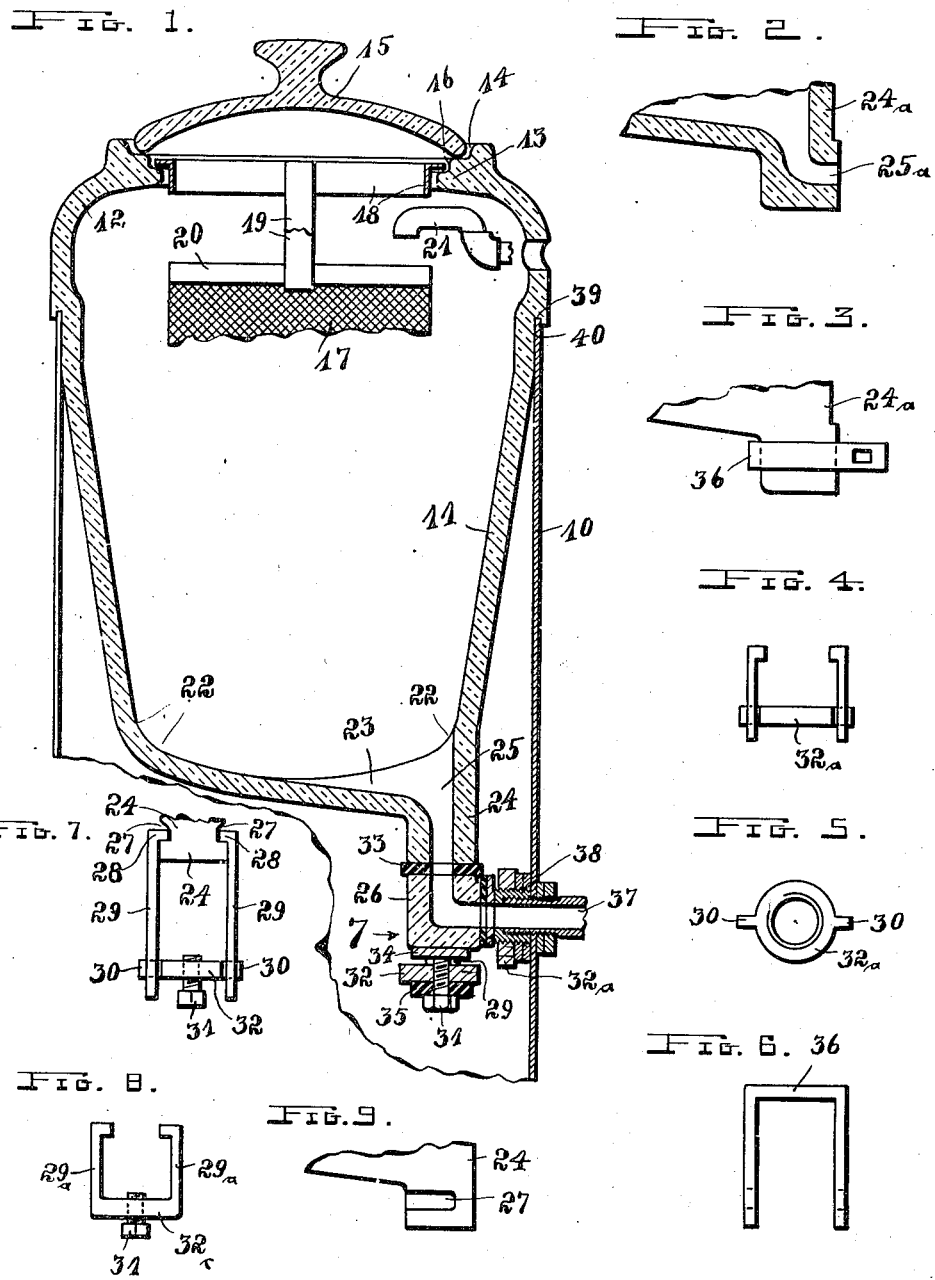
INVENTOR:
WILLIAM SCHASSLER,
By: Otto H. Kugler,
his Atty.

Patented May 2, 1939

2,156,515

UNITED STATES PATENT OFFICE 2,156,515

BEVERAGE VESSEL

William Schassler, Oakland, Calif.

Application June 26, 1937, Serial No. 150,437

1 Claim. (Cl. 53—3)

This invention relates to a device used for preparing and dispensing beverages, such as coffee.

One of the objects of this invention is to provide a device so designed that it will drain readily.

Another object is to provide a device so designed that it offers a most sanitary condition in so far that as little as possible metal is exposed to the beverage at any time, during the period of preparation as well as when dispensed from the device.

Another object is to provide a device with attachments that are easily removed and applied.

Another object is to provide a simple holder for material to be handled in the device.

Another object is to provide simple means for supporting the special holder for the material.

Other objects will appear from the following description and appended claim as well as from the accompanying drawing, in which—

Fig. 1 is a general vertical midsectional view of a vessel according to this invention with attachments and support for material to be handled therein, partly broken away.

Fig. 2 is a vertical section through a slightly modified form of outlet.

Fig. 3 is a fragmentary side elevation of an attachment for the outlet.

Fig. 4 is a side elevation of a slightly modified form of attachment for an outlet.

Fig. 5 is a top plan view of a crosshead.

Fig. 6 is a side elevation of another slightly modified form of attachment.

Fig. 7 is a fragmentary side elevation of the attachment shown in Fig. 1 as seen in the direction of the arrow 7.

Fig. 8 is another slightly modified form of attachment in side elevation.

Fig. 9 is a fragmentary side elevation of an outlet, indicating means for engaging the attachments.

Devices of this type are commonly mounted in plated metal casings by which they are held at convenient places near the serving counters in restaurants.

A casing of this type is indicated at 10 in Fig. 1.

The beverage-holding container, however, is preferably of porcelain, or vitreous china, or similar material, such a container being indicated at 11.

As illustrated, this container is preferably made of the form shown, for several reasons as will be more fully explained hereafter.

The top portion 12 is arched over the larger conical body of the container 11, to form an opening substantially smaller than the inside of the larger body, and, at the same time, to form deflecting walls for the rising steam to be directed in desired directions, to act most favorably on matter handled in such a device.

The top and inwardly facing edge 13 of the container is shouldered, in the first place, to form a seat 14 for the cover 15, and, secondly, at 16, for receiving the basket, or similar means 17 for any material, such as coffee, to be handled in the device.

This basket 17 is made of the upper ring 18 from which strips 19 extend downwardly to the ring 20, on the upper edge of the basket 17.

The spacing between the ring 18 and the ring 20 serves to allow a swinging of the swiveled water-spout 21 to and from the operating position, this swiveling being common in similar types of devices, but here arranged for more efficient operations.

Together with the arching, referred to previously, the arrangement of the water-spout 21, being a part of the automatic feeder as commonly in use with devices of this type, allows a swinging of this spout into the most favorable position in direct line with the natural circulation within the container with respect to the arched form of the inner walls of the container, closely above the basket 17 and away from the cover 17, particularly, away from the supports 18.

It should be clear from this that the ring 18 and the strips 19 are practically not at all within the natural circulating path during the preparation of coffee.

On removal of the cover 15, it should also be clear that the ring 18 is close to the top edge, readily reached for any exchange of material to be handled in the device.

The swiveled spout can readily be turned sidewise to an extent that the basket can be withdrawn from the container 11 through the small opening in the top.

The bottom of the container 11 is well rounded all around as indicated at 22, and provided with a slanting channel 23, to readily drain into the communicating outlet-connection 24.

A connection for this outlet is also preferably made of porcelain or similar material so that the material handled in this device is really as little as possible in direct contact with any metal.

Even the arrangement of connecting the parts is such that practically no metal comes into direct contact with the handled material, such as coffee.

One method of applying such a special connection is illustrated at the bottom end of Fig. 1, the elbow 26 being therefore of porcelain or similar material, sealed to the outlet by a suitable packing ring 33.

In cases where a sidewise outlet is desired, of course, the elbow 26 is eliminated, such a form being illustrated in Figs. 2 and 3, the outlet connection being directly formed accordingly, as indicated at 24a, with the outlet opening pointing sidewise, as indicated at 25a.

With the downwardly discharging outlet 25, as illustrated in Fig. 1, the connection-end 24 is provided with cut-outs or recesses 27 as illustrated in Figs. 7 and 9, by which the hook-ends 28 of the bars 29 are engaged to the outlet-connection.

The opposite ends of the bars 29 are provided with apertures for the pin-ends 30 of the crosshead 32.

A set-screw 31, disposed in the crosshead, serves to press the elbow 26 against the outlet-connection 24, with the packing ring 33 inserted between the elbow and connection.

A washer 34 is inserted between the set-screw and the elbow to protect the elbow and to prevent breakage.

Another washer, of rubber or any other suitable material, is inserted between the head of the set-screw and the cross-head, as indicated at 35, to protect the otherwise exposed portion of the set-screw against corrosion.

Fig. 8 illustrates a slightly modified form in which the arms or bars 29a are made as integral parts of the crosshead 32a, which would, however, operate the same as the structures illustrated in Figs. 1 and 7.

In case of the sidewise discharge of Figs. 2 and 3, the attachment is preferably of the form illustrated in Figs. 3 and 6, in which the closed end 36 of the U-shaped yoke is readily applied over the back side of the connection-end 24a in the manner indicated in Fig. 3.

For the faucet-connection 37 of Fig. 1, a very similar attachment is used, for which the yoke and crosshead is illustrated in Figs. 4 and 5. Instead of a plain set-screw 31, a nipple 38 is used for tightening and sealing, this nipple being threaded inside and outside, the outside threading serving for setting and sealing against the outlet, and the inner threading serving to receive the faucet connection, as will easily be understood without further explanation.

The main vessel 11 is preferably provided with an annular groove 39 to tightly seat and seal the upper edge and end of the casing 10.

Having thus described my invention, I claim:

In a beverage vessel of the class described, a container made of porcelain or the like material for retaining heat, the larger body of the container being of a slightly conical form narrower at the bottom and wider near the top, the bottom being rounded around the edges with a concaved center and provided with a channel extending from said center to the side wall of the container deepening and slanting downwardly and with an outlet considerably lower than the lowest point of the concaved and channeled bottom, the top end of the container being substantially arched over the side walls of the main body and having an opening with a radially inwardly projecting plurally shouldered edge for cover and insert retainer, the outlet having means on the outside of the large body container for applying draining connections.

WILLIAM SCHASSLER.